US 8,996,773 B2

(12) United States Patent
Ho et al.

(10) Patent No.: US 8,996,773 B2
(45) Date of Patent: Mar. 31, 2015

(54) COMPUTER APPARATUS AND METHOD FOR DISTRIBUTING INTERRUPT TASKS THEREOF

(75) Inventors: Kuan-Jui Ho, New Taipei (TW); Yi-Hsiang Wang, New Taipei (TW); Wen-Pin Chiang, New Taipei (TW)

(73) Assignee: Via Technologies, Inc., New Taipei (TW)

( * ) Notice: Subject to any disclaimer, the term of this patent is extended or adjusted under 35 U.S.C. 154(b) by 354 days.

(21) Appl. No.: 13/485,174

(22) Filed: May 31, 2012

(65) Prior Publication Data

US 2013/0103872 A1 Apr. 25, 2013

(30) Foreign Application Priority Data

Oct. 20, 2011 (TW) .............................. 100138164 A (51) Int. Cl.
*G06F 13/24* (2006.01)
*G06F 9/48* (2006.01)
*G06F 9/50* (2006.01)

(52) U.S. Cl.
CPC ............ *G06F 9/4812* (2013.01); *G06F 9/5033* (2013.01)
USPC ......................................................... 710/260

(58) Field of Classification Search
CPC .................................................... G06F 9/5033
USPC ................................................. 710/260–269
See application file for complete search history.

(56) References Cited

U.S. PATENT DOCUMENTS

| 3,421,150 | A | * | 1/1969 | Viss et al. ..................... 710/264 |
| 5,283,904 | A | * | 2/1994 | Carson et al. ................. 710/266 |
| 5,437,032 | A | * | 7/1995 | Wolf et al. ..................... 718/103 |
| 5,515,538 | A | * | 5/1996 | Kleiman ....................... 710/260 |
| 5,555,420 | A | * | 9/1996 | Sarangdhar et al. .......... 710/266 |
| 5,872,972 | A | * | 2/1999 | Boland et al. ................. 718/102 |
| 7,117,285 | B2 | * | 10/2006 | Ota ................................ 710/265 |
| 7,316,017 | B1 | * | 1/2008 | Jacobson et al. .............. 718/102 |
| 7,328,294 | B2 | * | 2/2008 | Kim et al. ...................... 710/260 |
| 7,810,096 | B2 | | 10/2010 | Saito et al. |
| 8,260,996 | B2 | * | 9/2012 | Wolfe ............................ 710/269 |
| 8,312,195 | B2 | * | 11/2012 | van Riel ........................ 710/267 |
| 8,321,614 | B2 | * | 11/2012 | Wolfe ............................ 710/267 |
| 8,612,661 | B2 | * | 12/2013 | Shimada ....................... 710/264 |
| 2007/0124568 | A1 | | 5/2007 | Kra |
| 2010/0274941 | A1 | | 10/2010 | Wolfe |
| 2013/0047162 | A1 | * | 2/2013 | Stefanov et al. .............. 718/102 |

* cited by examiner

*Primary Examiner* — Paul R Myers
(74) *Attorney, Agent, or Firm* — Kirton McConkie; Evan R. Witt (57) ABSTRACT

A computer apparatus and a method for distributing interrupt tasks thereof are provided. The computer apparatus has a plurality of CPUs and a chipset, and the chipset is electrically coupled to each of the CPUs. The chipset is configured for receiving an interrupt request sent from an external hardware device and judging whether or not a task type corresponding to the interrupt request has ever been performed by any one of the CPUs. If a judging result thereof is yes, the chipset assigns the interrupt request to the CPU that has ever performed the task type, so as to perform a corresponding interrupt task.

11 Claims, 12 Drawing Sheets

COMPUTER APPARATUS AND METHOD FOR DISTRIBUTING INTERRUPT TASKS THEREOF

FIELD OF THE INVENTION

The present invention relates to the field of the computer apparatus, and more particularly to a computer apparatus having a plurality of CPUs (Central Processing Units) and a method for distributing interrupt tasks thereof.

BACKGROUND OF THE INVENTION

Figure 1:
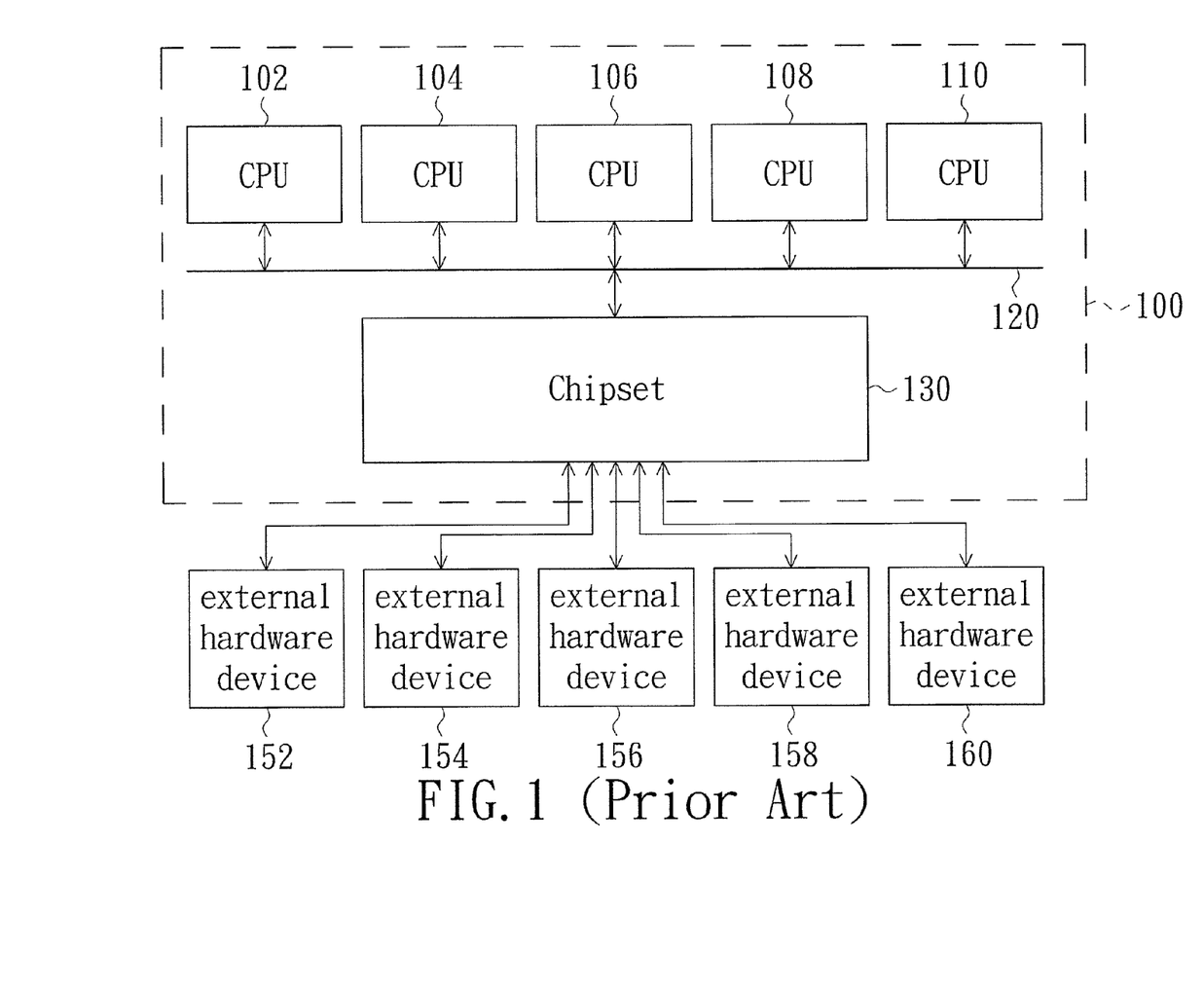
FIG. 1 is a schematic view for showing a conventional computer apparatus having a plurality of CPUs and a conventional method for distributing interrupt tasks thereof.

FIG. 1 is a schematic view for showing a conventional method for distributing interrupt tasks of a computer apparatus having a plurality of CPUs. Referring to FIG. 1, the computer apparatus 100 has five CPUs (as indicated by labels 102-110), a system bus 120 and a chipset 130. Each of the CPUs is electrically coupled to the chipset 130 via the system bus 120. In this present application, CPU is an interchangeable or equivalent term of processor or processor core. Furthermore, the computer apparatus 100 is suitable for coupling with a plurality of external hardware devices (such as external hardware devices as indicated by labels 152-160), and each of the external hardware devices is electrically coupled to the chipset 130.

Each of the CPUs transmits a task priority temporarily stored in a task priority register (TPR) therein to the chipset 130 according to a predetermined period, so as to notify the chipset 130 of the priority of the currently-performed task. Then the chipset 130 judges the current workloads of the CPUs according to the received task priorities. Therefore, when an external hardware device (which may be any one of the external hardware devices 152-160) sends out an interrupt request to the chipset 130, the chipset 130 can select a CPU of which the current workload is fewest (i.e., the CPU with the lowest task priority) from the CPUs to perform an interrupt task corresponding to the interrupt request.

However, since each of the CPUs will sends data to a corresponding cache thereof before performing a task and the CPU with the fewest current workload is altered along the time shift, this may cause a problem that the same data is sent to a cache of another CPU (of which the workload is fewest) again when the same external hardware device sends out the same interrupt request again. Therefore, the whole efficiency of the computer apparatus 100 is decreased.

SUMMARY OF THE INVENTION

The present invention relates to a computer apparatus having a plurality of CPUs, of which the data-varying frequencies of the caches are low, so that the whole efficiency of the computer apparatus is improved.

The present invention also relates to a method for distributing interrupt tasks, which is adapted to a computer apparatus having a plurality of CPUs.

The present invention provides a computer apparatus. The computer apparatus has a plurality of CPUs and a chipset, and the chipset is electrically coupled to each of the CPUs. The chipset is configured for receiving an interrupt request sent from an external hardware device and judging whether or not a task type corresponding to the interrupt request has ever been performed by any one of the CPUs. If a judging result thereof is yes, the chipset assigns the interrupt request to the CPU that has ever performed the task type to perform a corresponding interrupt task.

The present invention also provides a method for distributing interrupt tasks of a computer apparatus having a plurality of CPUs. The method comprises the following steps: judging whether or not a task type corresponding to an interrupt request sent from an external hardware device has ever been performed by any one of the CPUs; and assigning the interrupt request to the CPU that has ever performed the task type to perform a corresponding interrupt task if a judging result thereof is yes.

An interrupt handling apparatus is provided by the present invention. The interrupt handling apparatus comprises a first interface and a second interface, and the two interfaces are electrically coupled to a plurality of processors and at least one external hardware device, respectively. The interrupt handling apparatus further comprises an interrupt receiving module electrically coupled to the second interface for receiving an interrupt request from the at least one external hardware device. A memory configured to store the handling information with respect to a handled interrupt request is included. The handling information comprises a task type of the handled interrupt request and whether any of the processors was assigned to handle the task type of the interrupt request. The interrupt handling apparatus further comprises an interrupt assigning module electrically coupled to the first interface, the interrupt receiving module and the memory and configured to assign the received interrupt request to one of the processors in accordance with the handling information stored in the memory.

The present invention makes the chipset assign the interrupt request to the CPU that has ever performed the same task type to perform a corresponding interrupt task, so that the data-varying frequencies of the caches are low, and the whole efficiency of the computer apparatus is improved.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
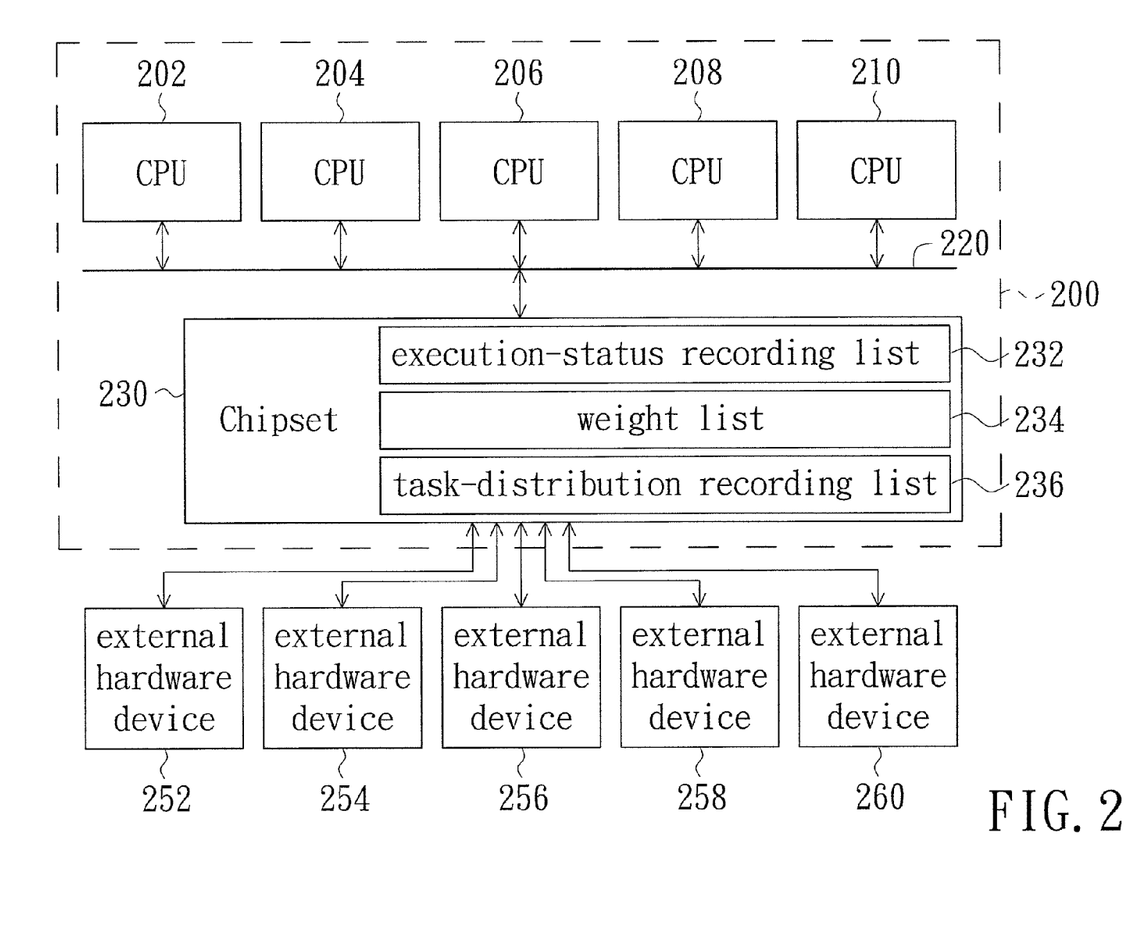
FIG. 2 is a schematic view for showing a computer apparatus and a method for distributing interrupt tasks thereof in accordance with an exemplary embodiment of the present invention.

FIG. 2 is a schematic view for showing a computer apparatus and a method for distributing interrupt tasks thereof in accordance with an exemplary embodiment of the present invention. Referring to FIG. 2, the computer apparatus 200 has a plurality of CPUs (such as five CPUs as indicated by labels 202-210), a system bus 220 and a chipset 230. Furthermore, each of the CPUs is electrically coupled to the chipset 230 via the system bus 220. In addition, the computer apparatus 200 is suitable for coupling with a plurality of external hardware devices (such as external hardware devices as indicated by labels 252-260), and each of the external hardware devices is all electrically coupled to the chipset 230.

The chipset 230 is configured for receiving an interrupt request sent from an external hardware device (such as one of the external hardware devices 252-260) and judging whether or not a task type corresponding to the interrupt request has ever been performed by any one of the CPUs. In an exemplary embodiment, the task type may be an interrupt vector. If a judging result thereof is yes, the chipset 230 assigns the interrupt request to the CPU that has ever performed the task type to perform a corresponding interrupt task. If the judging result thereof is no, the chipset 230 selects one of the five CPUs to perform the interrupt task corresponding to the interrupt request.

Since the chipset 230 distributes the received interrupt request to the CPU that has ever performed the same task type to perform the corresponding interrupt task, the present invention can reduce the probability of sending the same data to different caches (not shown). That is, the data-varying frequencies of the caches can be reduced, so that the whole efficiency of the computer apparatus 200 is improved.

The following will describe the chipset 230 in detail.

In this embodiment, the chipset 230 may store an execution-status recording list 232 therein. The execution-status recording list 232 is configured for recording whether each of the task types has ever been performed by any one of the CPUs, so that the chipset 230 can read out and update the recorded content thereof. In an exemplary embodiment, the task type may be an interrupt vector.

In addition, the chipset 230 may further store a weight list 234. The weight list 234 is configured for recording the weight sum value of the task types that have ever been performed by the same CPU, so that the chipset 230 can read out and update the recorded content thereof. When the chipset 230 judges that the task type corresponding to the interrupt request has never been performed by any one of the CPUs, the chipset 230 will select the CPU corresponding to the minimum of the weight sum values recorded in the weight list 234 to perform the interrupt task corresponding to the interrupt request, and the chipset 230 will amends (i.e., increases) the weight sum value corresponding to the selected CPU according to the weight corresponding to the interrupt request.

In addition, the chipset 230 may further store a task-distribution recording list 236. The task-distribution recording list 236 is configured for recording each of the task types corresponding to the interrupt requests has ever been performed by which of the CPUs, so that the chipset 230 can read out and update the recorded content. When the chipset 230 judges that the task type corresponding to the interrupt request has ever been performed by one of the CPUs, the chipset 230 will select the CPU that has ever performed the task type from the task-distribution recording list 236, so as to assign the interrupt request to the selected CPU to perform the corresponding interrupt task.

The chipset 230 may store all of the execution-status recording list 232, the weight list 234 and the task-distribution recording list 236. Alternatively, the chipset 230 may store at least one of the three lists, and the other lists may be stored in a memory device (not shown) electrically coupled to the chipset 230, so that the chipset 230 can read out and update the recorded contents thereof.

Figure 3A:
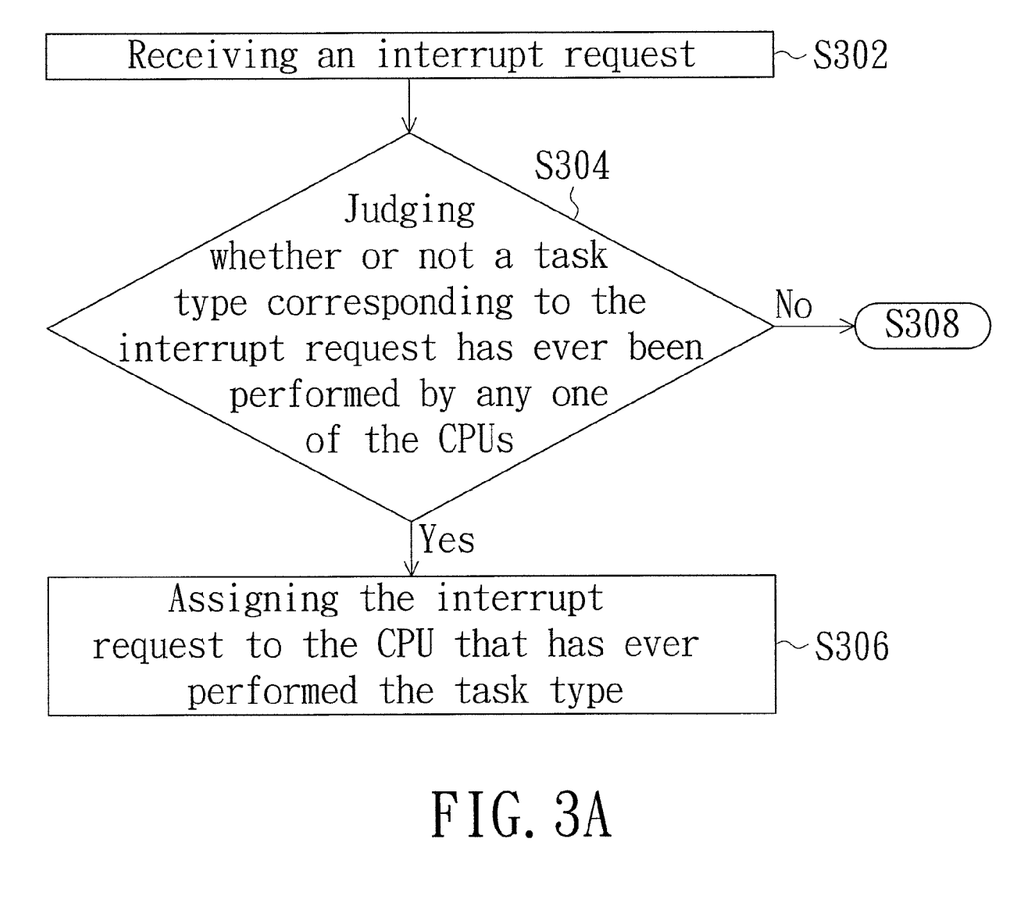
FIGS. 3A and 3B show a flow chart of an operation mode of a chipset as shown in FIG. 2.
Figure 3B:
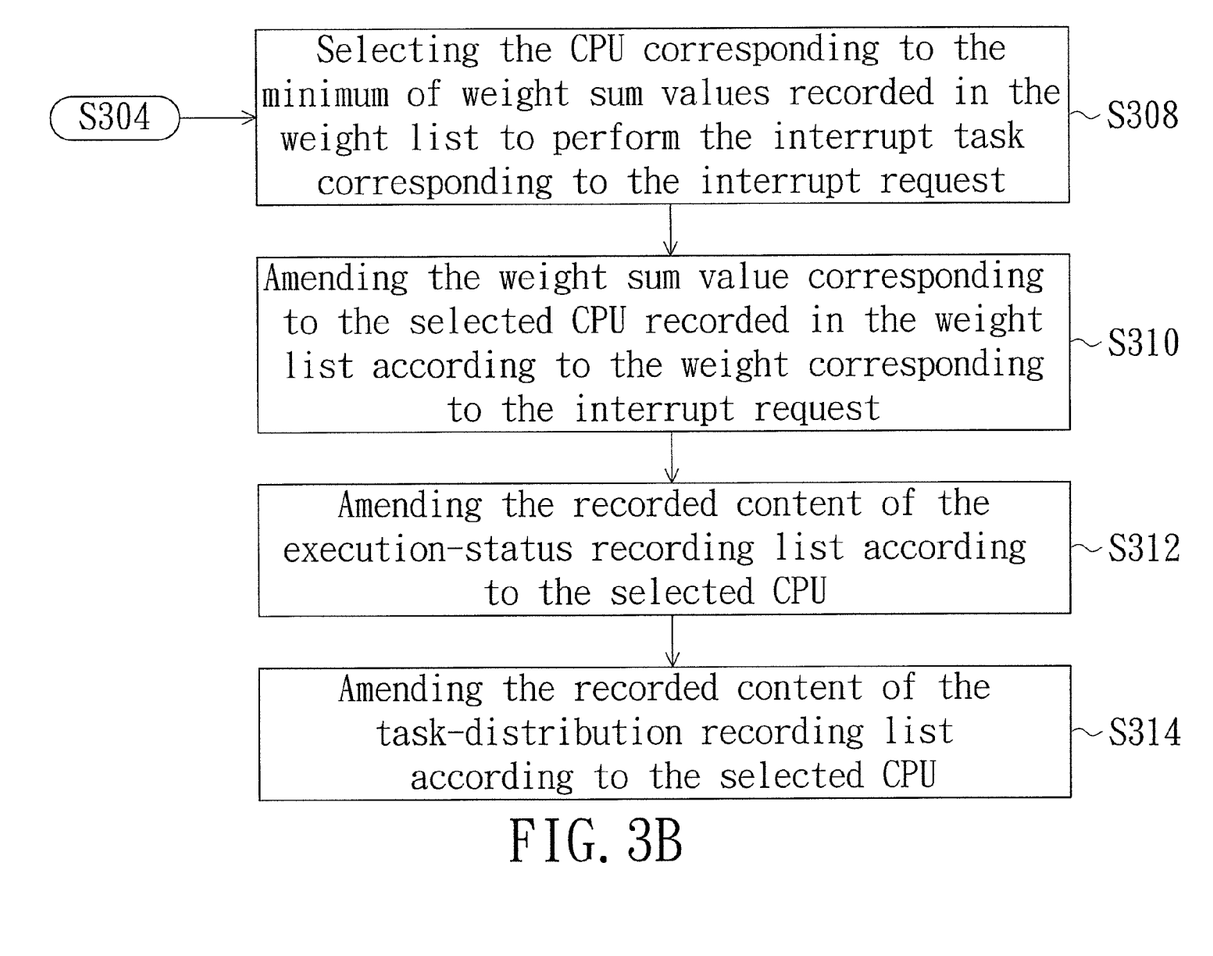

If the chipset 230 stores all of the execution-status recording list 232, the weight list 234 and the task-distribution recording list 236, the operation of the chipset 230 can be performed by a mode as shown in FIGS. 3A and 3B. FIGS. 3A and 3B show a flow chart of an operation mode of the chipset as shown in FIG. 2. Referring to FIGS. 3A and 3B, after the chipset 230 receives an interrupt request (as indicated by step S302), the chipset 230 may judge whether or not a task type corresponding to the interrupt request has ever been performed by any one of the CPUs according to the recorded content of the execution-status recording list 232 (as indicated by step S304).

If a judging result thereof is yes, the chipset 230 may assign the interrupt request to the CPU that has ever performed the task type (as indicated by step S306), so that the assigned CPU can perform a corresponding interrupt task. On the contrary, if the judging result thereof is no, the chipset 230 may select the CPU corresponding to the minimum of the weight sum values recorded in the weight list 234 according to the recorded content of the weight list 234, so that the selected CPU can perform the interrupt task corresponding to the interrupt request (as indicated by step S308).

After performing the step S308, the chipset 230 may update the recorded contents of the execution-status recording list 232, the weight list 234 and the task-distribution recording list 236. For example, the chipset 230 may firstly amend the weight sum value corresponding to the selected CPU of the weight list 234 according to the weight corresponding to the interrupt request (as indicated by step S310), then the chipset 230 may amend the recorded content of the execution-state recording list 232 according to the selected CPU (as indicated by step S312), and the chipset 230 may finally amend the recorded content of the task-distribution recording list 236 according to the selected CPU (as indicated by step S314). Certainly, the chipset 230 may also perform the above three steps according to other sequences.

Figure 4:
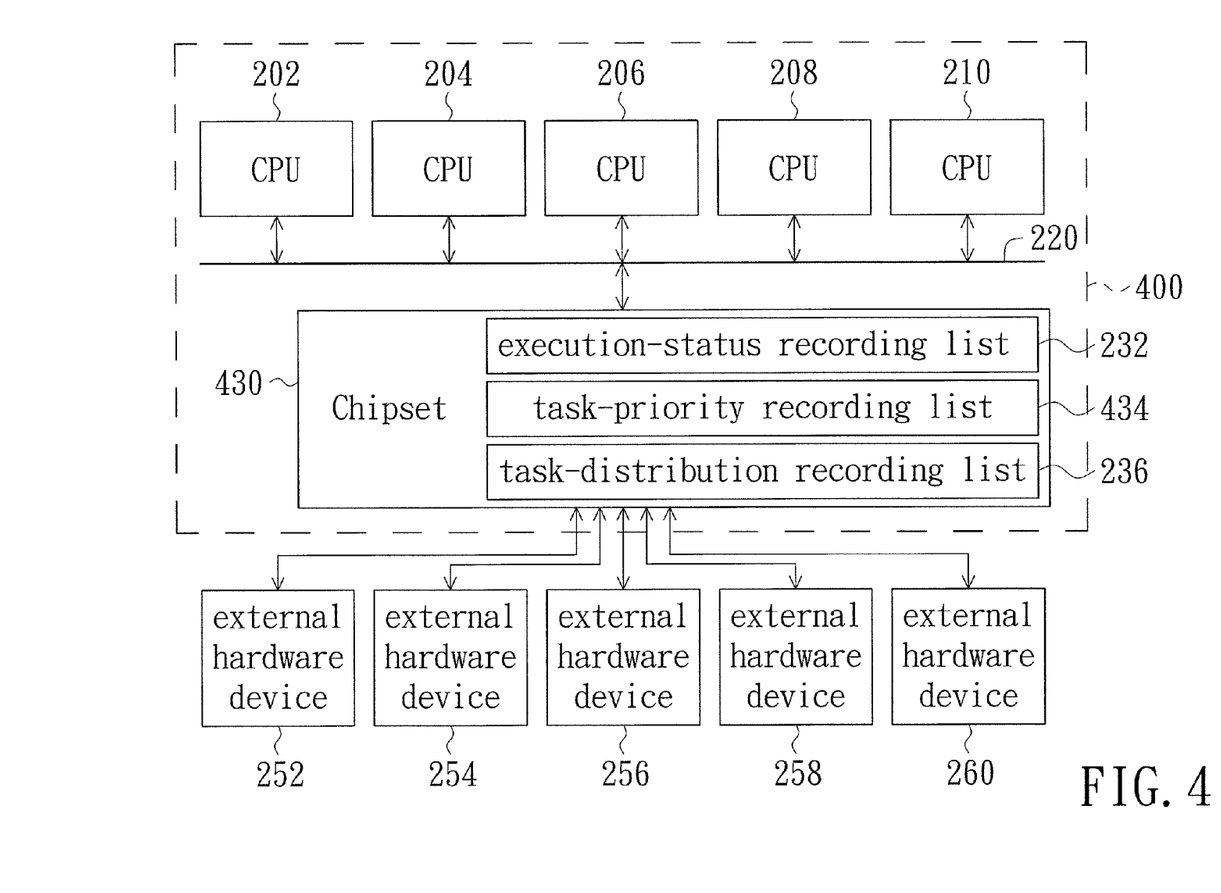
FIG. 4 is a schematic view for showing a computer apparatus and a method for distributing interrupt tasks thereof in accordance with another exemplary embodiment of the present invention.

FIG. 4 is a schematic view for showing a computer apparatus and a method for distributing interrupt tasks thereof in accordance with another exemplary embodiment of the present invention. In FIG. 4, the labels same to those of FIG. 2 represent same objects. Referring to FIG. 4 and FIG. 2, by comparing the two FIGS, it can be seen that the chipset 430 of the computer apparatus 400 as shown in FIG. 4 does not store the above weight list 234, but it stores a task-priority recording list 434. The task-priority recording list 434 is configured for recording each of the priority values of the tasks that are currently performed by the CPUs, so that the chipset 430 can read out and update the recorded content of the task-priority recording list 434. The mode for obtaining the priority values is described in the prior art, and it is not further described herein.

Since the task-priority recording list 434 records the priority values of the tasks that are currently performed by the CPUs, the chipset 430 can select the CPU corresponding to the minimum of the priority values recorded in the task-priority recording list 434 to perform the interrupt task corresponding to the interrupt request when the chipset 430 judges that the task type corresponding to the interrupt request has never been performed by any one of the CPUs. On the contrary, the chipset 430 will assign the interrupt request to the CPU that has ever performed the task type to perform a corresponding interrupt task when the chipset 430 judges that the task type corresponding to the interrupt task has ever been performed by one of the CPUs. Thus, the present invention can reduce the probability of sending the same data to different caches. That is, the data-varying frequencies of the caches can be reduced, so that the whole efficiency of the computer apparatus 400 is improved. In an exemplary embodiment, the task type may be an interrupt vector.

The chipset 430 may store all of the above execution-status recording list 232, the task-priority recording list 434 and the task-distribution recording list 236. Alternatively, the chipset 430 may also store at least one of the above three lists, and the other lists may be stored in a memory device (not shown) electrically coupled to the chipset 430, so that the chipset 430 can read out and update the recorded contents thereof.

Figure 5A:
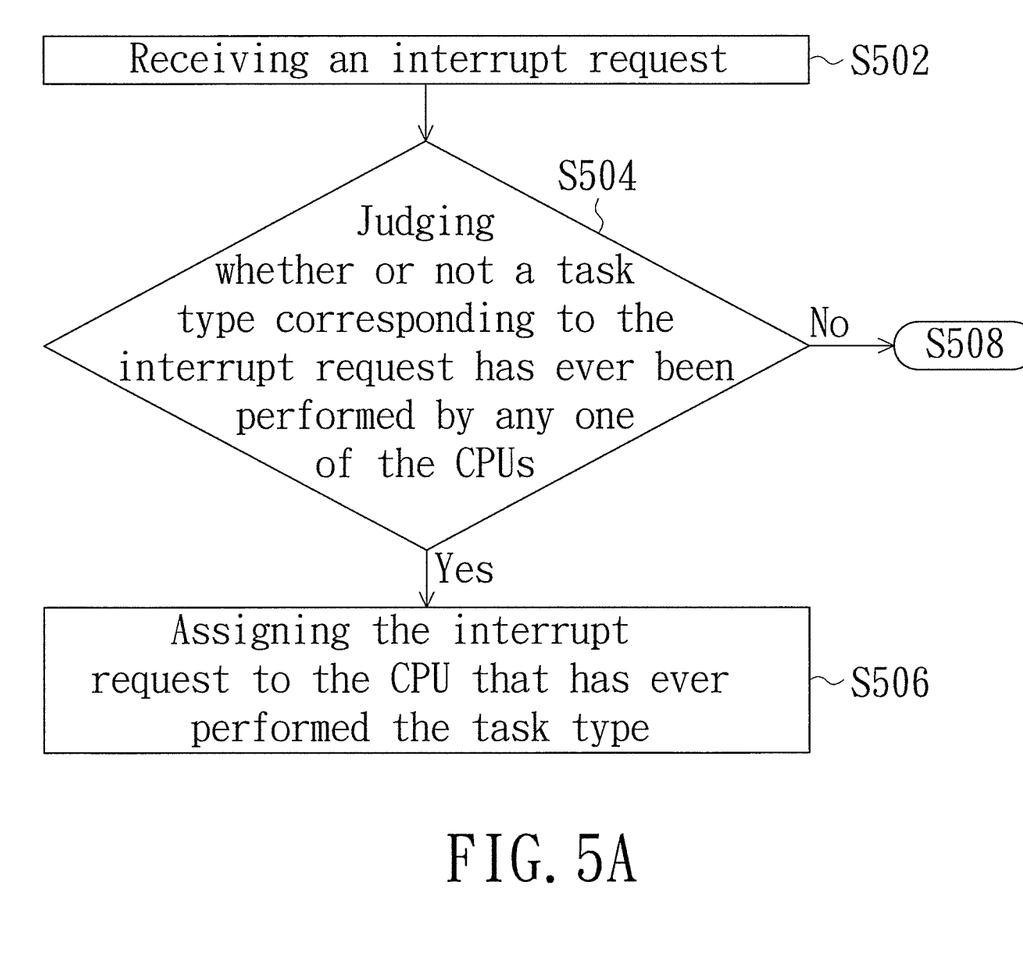
FIGS. 5A and 5B show a flow chart of an operation mode of a chipset as shown in FIG. 4.
Figure 5B:
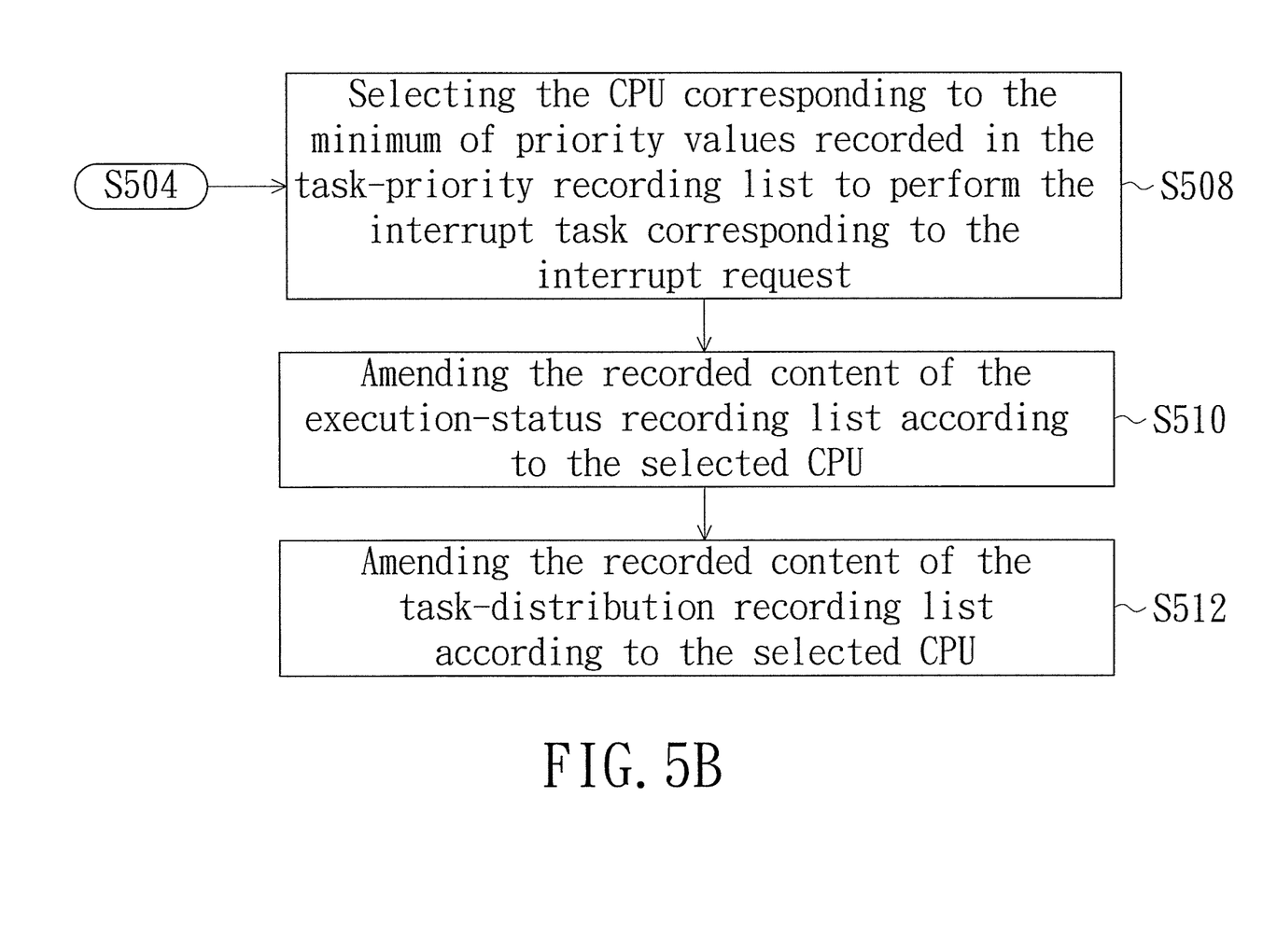

If the chipset 430 stores all of the execution-status recording list 232, the task-priority recording list 434 and the task-distribution recording list 236, the operation of the chipset 430 can be performed by a mode as shown in FIGS. 5A and 5B. FIGS. 5A and 5B show a flow chart of an operation mode of the chipset as shown in FIG. 4. Referring to FIGS. 5A and 5B, after the chipset 430 receives an interrupt request (as indicated by step S502), the chipset 430 may judge whether or not a task type corresponding to the interrupt request has ever been performed by any one of the CPUs according to the recorded content of the execution-status recording list 232 (as indicated by step S504).

If a judging result thereof is yes, the chipset 530 may assign the interrupt request to the CPU that has ever performed the task type (as indicated by step S506), so that the assigned CPU can perform a corresponding interrupt task. On the contrary, if the judging result thereof is no, the chipset 530 may select the CPU corresponding to the minimum of the priority values recorded in the task-priority recording list 434 according to the recorded content of the task-priority recording list 434, so that the selected CPU can perform the interrupt task corresponding to the interrupt request (as indicated by step S508).

After performing the step S508, the chipset 430 may updates the recorded contents of the execution-status recording list 232 and the task-distribution recording list 236. For example, the chipset 430 may firstly amend the recorded content of the execution-status recording list 232 according to the selected CPU (as indicated by step S510), then the chipset 430 may amend the recorded content of the task-distribution recording list 236 according to the selected CPU (as indicated by step S512). Certainly, the chipset 430 may also perform the steps S510 and S512 according to an opposite sequence.

From the above exemplary embodiments, it is understood for persons skilled in the art that the CPUs may be electrically coupled by other modes to perform the present invention, which will be described by FIGS. 6 and 7.

Figure 6:
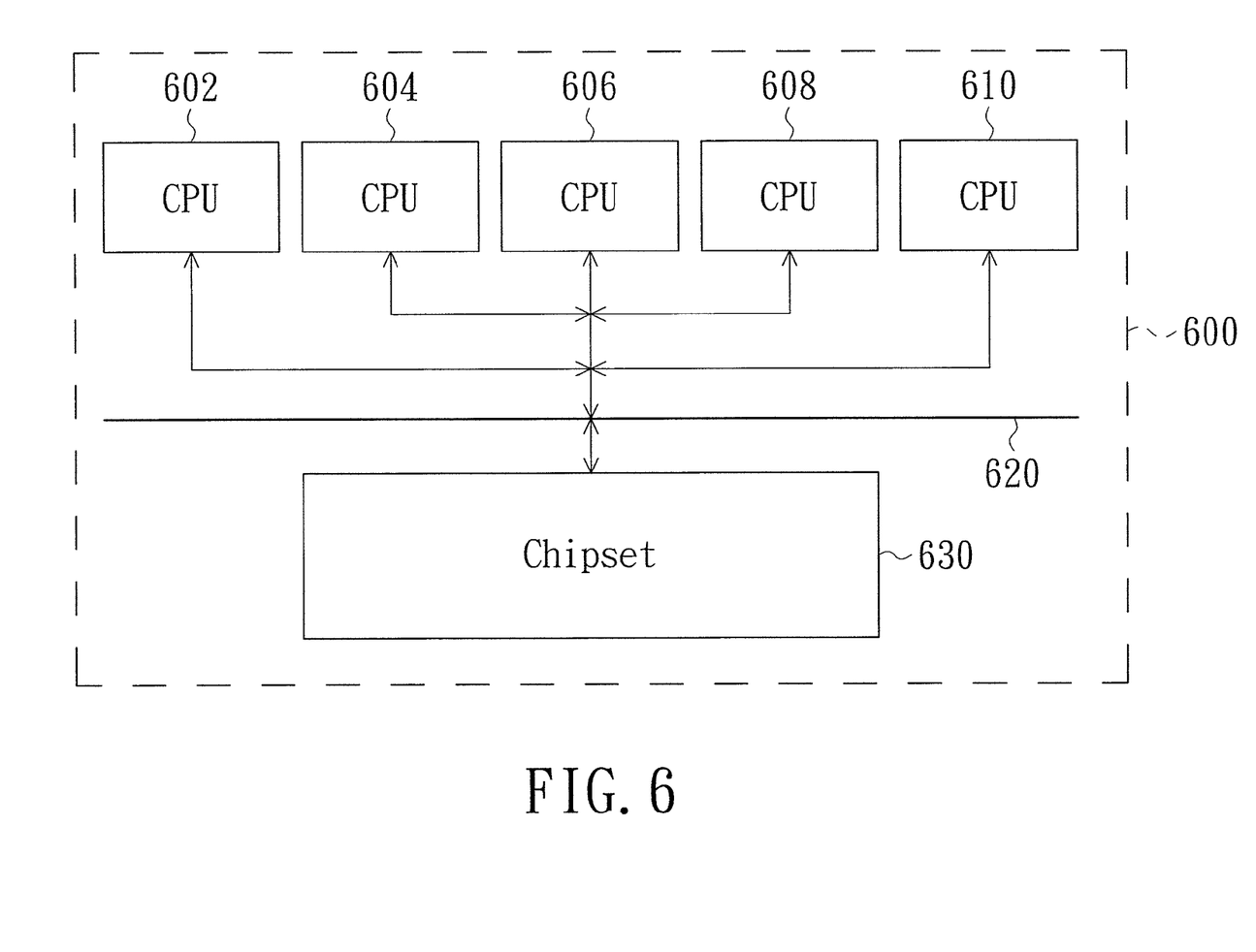
FIG. 6 is a schematic view for showing another electrically-coupling mode of CPUs.

FIG. 6 is a schematic view for showing another electrically-coupling mode of the CPUs. As shown in FIG. 6, the computer apparatus 600 has a plurality of CPUs (such as five CPUs as indicated by labels 602-610), a system bus 620 and a chipset 630. In this exemplary embodiment, the CPUs 602, 604, 608 and 610 are electrically coupled to the system bus 620 via the CPU 606. The chipset 630 may be any one of the above chipsets.

Figure 7:
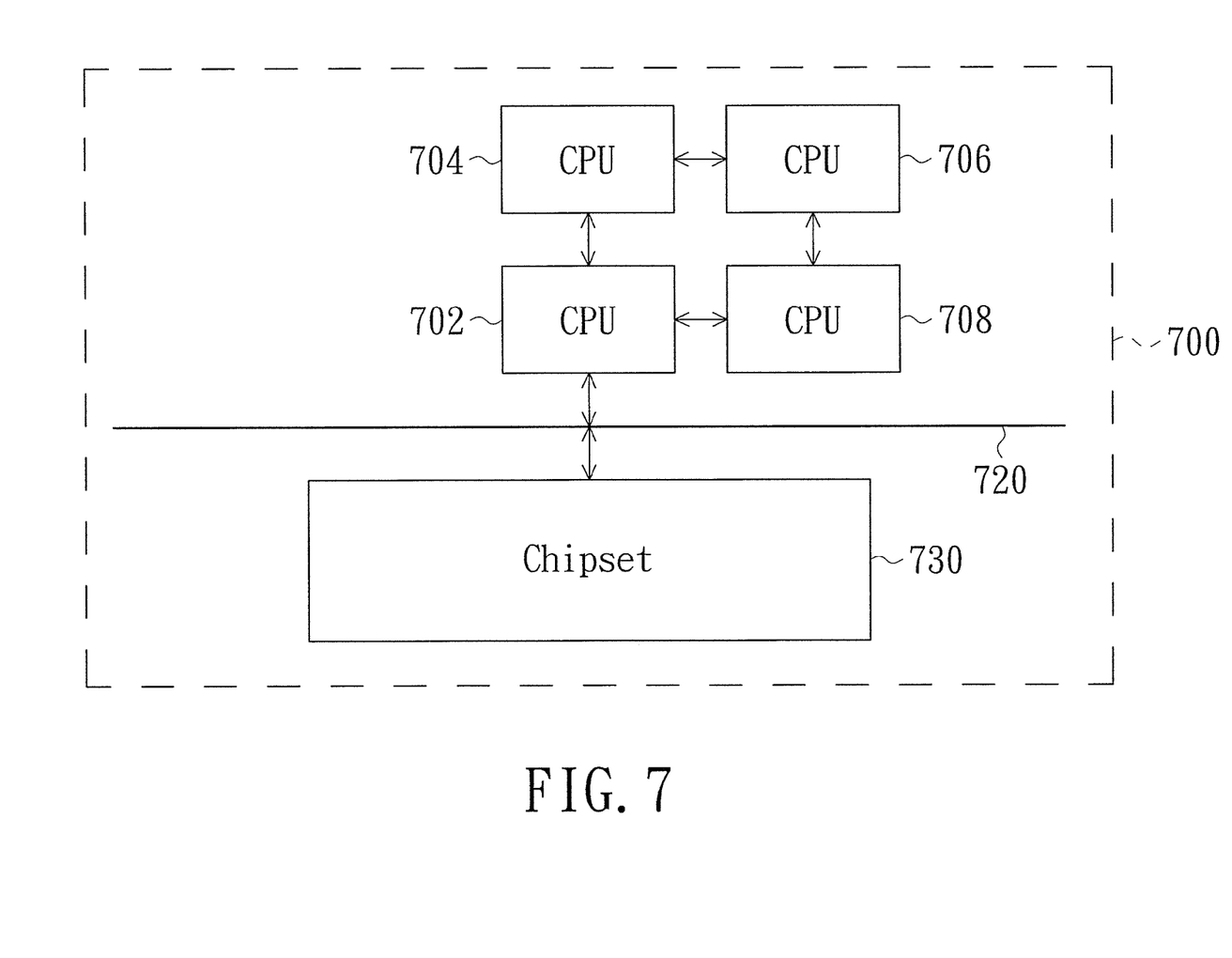
FIG. 7 is a schematic view for showing still another electrically-coupling mode of CPUs.

FIG. 7 is a schematic view for showing still another electrically-coupling mode of the CPUs. As shown in FIG. 7, the computer apparatus 700 has a plurality of CPUs (such as four CPUs as indicated by labels 702-708), a system bus 720 and a chipset 730. In this exemplary embodiment, the CPUs 704-708 are electrically coupled to the system bus 720 via the CPU 702, and each of the CPUs is electrically coupled to two other CPUs. The chipset 730 may be any one of the above chipsets.

It should be noted that, in the above exemplary embodiments, each of the CPUs may be a physical CPU, or a logical partition of a physical CPU.

Figure 8:
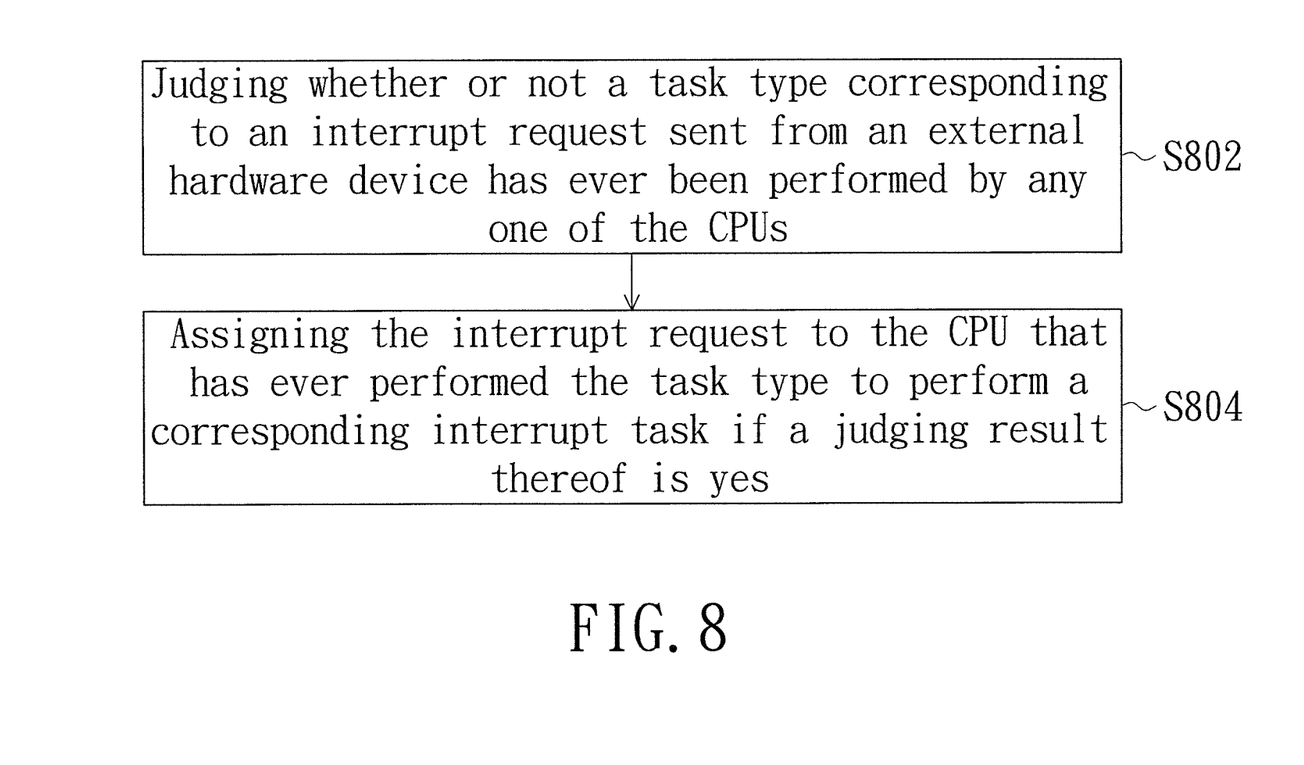
FIG. 8 is a schematic view for showing a method for distributing interrupt tasks of a computer apparatus having a plurality of CPUs in accordance with an exemplary embodiment of the present invention.

From the above exemplary embodiments, it is understood for persons skilled in the art that a basic operation mode of the computer apparatus of the present invention can be concluded, which is as shown in FIG. 8. FIG. 8 is a schematic view for showing a method for distributing interrupt tasks of a computer apparatus having a plurality of CPUs in accordance with an exemplary embodiment of the present invention. Referring to FIG. 8, the method comprises the following steps: judging whether or not a task type corresponding to an interrupt request sent from an external hardware device has ever been performed by any one of the CPUs (as indicated by step S802); and assigning the interrupt request to the CPU that has ever performed the task type to perform a corresponding interrupt task if a judging result thereof is yes (as indicated by step S804). In an exemplary embodiment, the task type may be an interrupt vector.

Figure 9:
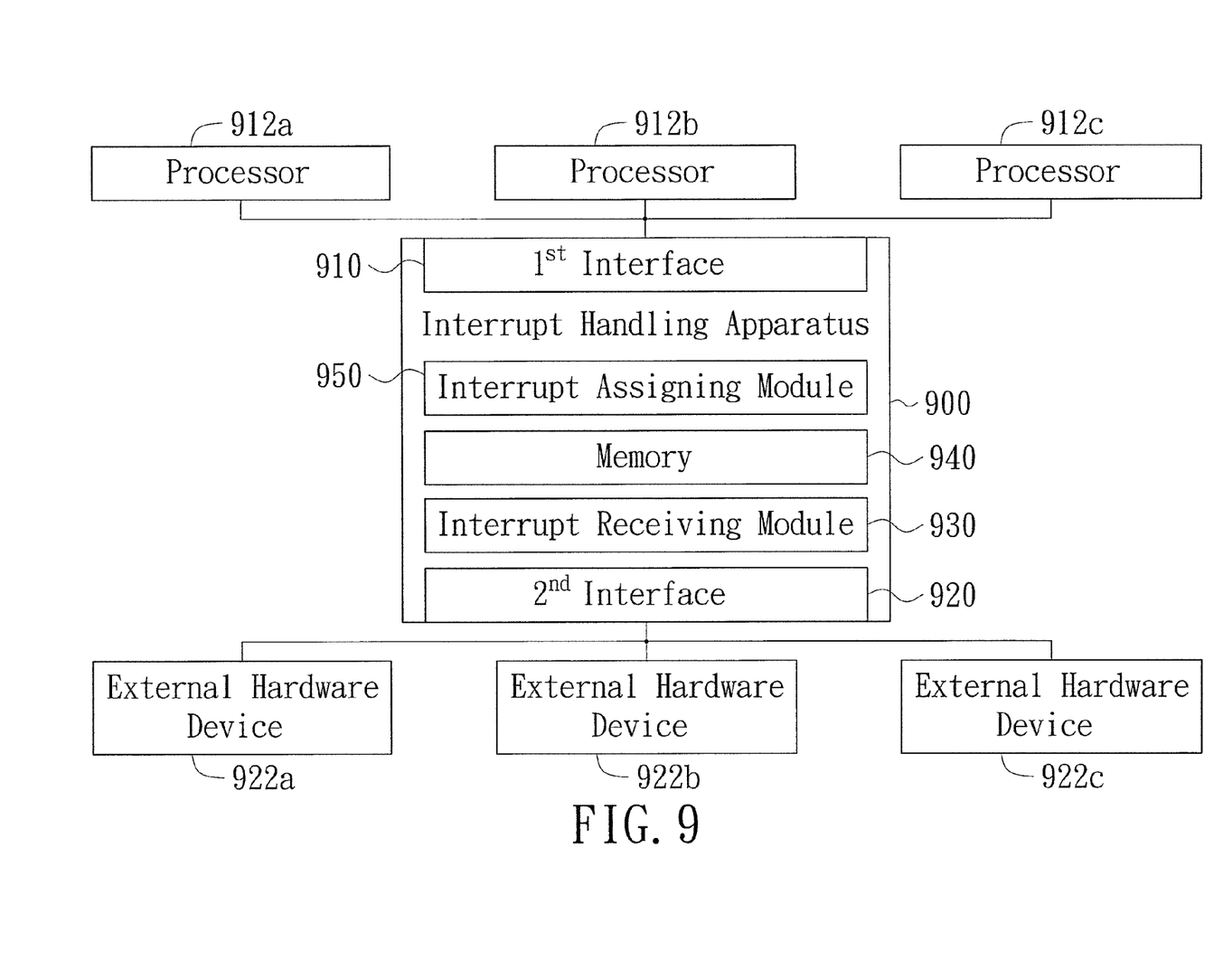
FIG. 9 shows a schematic view depicting an interrupt handling apparatus in accordance with an embodiment of the present invention.
Figure 10:
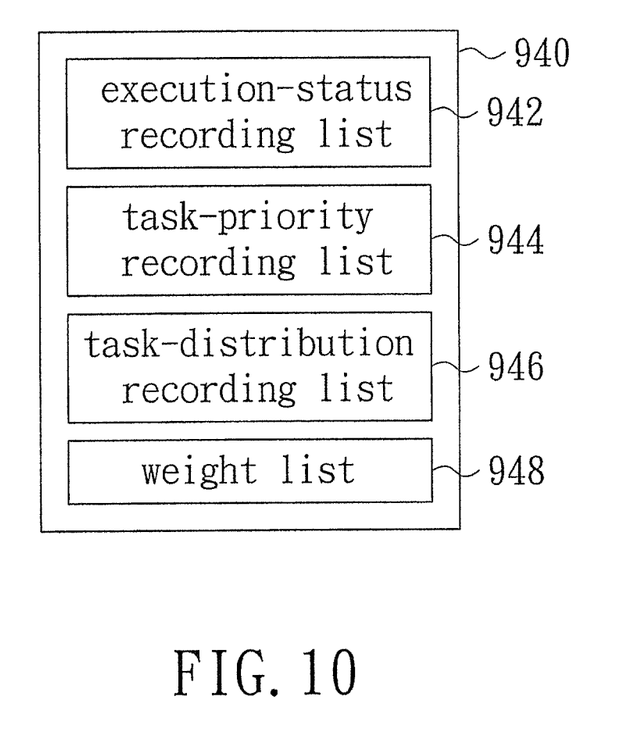
FIG. 10 shows the contents of the memory in accordance with an embodiment of the present invention.

FIG. 9 depicts an interrupt handling apparatus 900 according to an embodiment of the present invention. FIG. 10 shows the contents of the memory in accordance with an embodiment of the present invention. Please refer to FIGS. 9 and 10. The apparatus 900 may be implemented in the bridge chipset of a personal computer or in a system-on-chip (SoC). There are $1^{st}$ interface 910 and $2^{nd}$ interface 920 for electrically coupling to a plurality of processors 912a, 912b, and 912c as well as external hardware devices 922a, 922b, and 922c. In case of one embodiment such as SoC, at least a portion of the processors 912a-912c and the external hardware devices 922a-922c may be implemented in the same die or in the same chip package.

An interrupt receiving module 930 is electrically coupled to the $2^{nd}$ interface 920 for receiving an interrupt request from the at least one external hardware device. A memory 940 is configured to store the handling information with respect to a handled interrupt request. The handling information comprises a task type of the handled interrupt request and whether any of the processors was assigned to handle the task type of the interrupt request. The task type may comprise an interrupt vector. The memory 940 may be implemented inside the apparatus 900 in some embodiments. In some examples, the memory 940 may be connected to the apparatus 900. Anyway, the present invention covers that the memory 940 could be accessed by the apparatus 900. An interrupt assigning module 950 is electrically coupled to the $1^{st}$ interface 910, the interrupt receiving module 930 and the memory 940. The interrupt assigning module 950 is used to assign the received interrupt request to one of the processors 912a-912c in accordance with the handling information stored in the memory 940.

In one example, the handling information comprises a weight value corresponding to each of the processors 912a-912c. A weight list 948 is stored in the memory 940. The interrupt assigning module 950 assigns the received interrupt request to one of the processors 912a-912c, which is chosen with a minimum weight value and was handled the same task type of the received interrupt request. After that, the interrupt assigning module 950 further modifies the weight value of the assigned processor 912 handling the received interrupt request.

In another example, the handling information comprises a priority value corresponding to each of the processors. A task-priority recording list 944 is stored in the memory 940. The priority value represents an importance level of the task performed by a corresponding processor. The interrupt assigning module 950 further assigns the received interrupt request to one of the processors, which is chosen with a minimum priority value and was handled the same task type of the received interrupt request.

In another example, the handling information comprises an execution-status recording list 942. The execution-status recording list 942 is configured for recording whether each of the task type has ever been handled by any one of the processors.

In other examples, the handling information comprises a task-distribution recording list 946 which is configured for recording each of the task type corresponding to the interrupt requests that has ever been handled. The interrupt assigning module 950 assigns the received interrupt request to one of the processors 912a-912c, which was handled the same task type of the received interrupt request. The interrupt assigning module 950 further modifies the task-distribution recording list 946 after the assigning step.

In summary, the present invention makes the chipset assign the interrupt request to the CPU that has ever performed the same task type to perform a corresponding interrupt task, so that the present invention can reduce the probability of sending the same data to different caches. That is, the data-varying frequencies of the caches can be reduced, so that the whole efficiency of the computer apparatus is improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A computer apparatus, comprising:
   a plurality of CPUs; and
   a chipset electrically coupled to the CPUs, wherein the chipset is configured for receiving an interrupt request sent from an external hardware device and judging whether or not a task type corresponding to the interrupt request has ever been performed by any one of the CPUs; if a judging result thereof is yes, the chipset assigns the interrupt request to the CPU that has ever performed the task type to perform a corresponding interrupt task,
   wherein the chipset further stores an execution-status recording list, and the execution-status recording list is configured for recording whether each of the task types has ever been performed by any one of the CPUs,
   wherein the chipset further stores a task-distribution recording list, the task-distribution recording list is configured for recording each of the task types corresponding to the interrupt requests that have ever been performed by which of the CPUs, when the chipset judges that the task type corresponding to the interrupt request has ever been performed by one of the CPUs, the chipset selects the CPU that has ever performed the task type from the task-distribution recording list, so as to assign the interrupt request to the selected CPU to perform the corresponding interrupt task, and
   wherein the corresponding task type comprises an interrupt vector.

2. The computer apparatus according to claim 1, wherein if the judging result thereof is no, the chipset selects one of the CPUs to perform the interrupt task corresponding to the interrupt request.

3. The computer apparatus according to claim 1, wherein the chipset further stores a weight list, the weight list is configured for recording the weight sum value of the task types that have ever been performed by the same CPU, when the chipset judges that the task type corresponding to the interrupt request has never been performed by any one of the CPUs, the chipset selects the CPU corresponding to the minimum of the weight sum values recorded in the weight list to perform the interrupt task corresponding to the interrupt request, and the chipset amends the weight sum value corresponding to the selected CPU according to the weight corresponding to the interrupt request.

4. The computer apparatus according to claim 1, wherein the chipset further stores a task-priority recording list, the task-priority recording list is configured for recording each of the priority values of the tasks that are currently performed by the CPUs, when the chipset judges that the task type corresponding to the interrupt request has never been performed by any one of the CPUs, the chipset selects the CPU corresponding to the minimum of the priority values recorded in the task-priority recording list to perform the interrupt task corresponding to the interrupt request.

5. A method for distributing interrupt tasks of a computer apparatus having a plurality of CPUs, comprising:
   judging whether or not a task type corresponding to an interrupt request sent from an external hardware device has ever been performed by any one of the CPUs;
   assigning the interrupt request to the CPU that has ever performed the task type to perform a corresponding interrupt task if a judging result thereof is yes;
   storing an execution-status recording list in the chipset of the computer apparatus, wherein the execution-status recording list is configured for recording whether each of the task types has ever been performed by any one of the CPUs; and
   storing a task-distribution recording list in the chipset of the computer apparatus, wherein the task-distribution recording list is configured for recording each of the task types corresponding to the interrupt requests that have ever been performed by which of the CPUs, when the task type corresponding to the interrupt request has ever been performed by one of the CPUs, the chipset selects the CPU that has ever performed the task type from the task-distribution recording list, so as to assign the interrupt request to the selected CPU to perform the corresponding interrupt task,
   wherein the corresponding task type comprises an interrupt vector.

6. The method according to claim 5, further comprising:
   selecting one of the CPUs to perform the interrupt task corresponding to the interrupt request if the judging result thereof is no.

7. The method according to claim 5, further comprising:
   storing a weight list in the chipset of the computer apparatus, wherein the weight list is configured for recording the weight sum values of the task types that have ever been performed by the same CPU, when the task type corresponding to the interrupt request has never been performed by any one of the CPUs, the chipset selects the CPU corresponding to the minimum of the weight sum values recorded in the weight list to perform the interrupt task corresponding to the interrupt request, and the chipset amends the weight sum value corresponding to the selected CPU according to the weight corresponding to the interrupt request.

8. The method according to claim 5, further comprising:

storing a task-priority recording list in the chipset of the computer apparatus, wherein the task-priority recording list is configured for recording each of the priority values of the tasks that are currently performed by the CPUs, when the task type corresponding to the interrupt request has never been performed by any one of the CPUs, the chipset selects the CPU corresponding to the minimum of the priority values recorded in the task-priority recording list to perform the interrupt task corresponding to the interrupt request.

9. An interrupt handling apparatus, comprising:

a first interface, electrically coupled to a plurality of processors;

a second interface, electrically coupled to at least one external hardware device;

an interrupt receiving module, electrically coupled to the second interface for receiving an interrupt request from the at least one external hardware device;

a memory, configured to store handling information with respect to a handled interrupt request, wherein the handling information comprises a task type of the handled interrupt request and whether any of the processors was assigned to handle the task type of the interrupt request; and an interrupt assigning module, electrically coupled to the first interface, the interrupt receiving module and the memory, configured to assign the received interrupt request to one of the processors in accordance with the handling information stored in the memory, wherein the handling information comprises an execution status recording list configured for recording whether each of the task types has ever been handled by any one of the processors, wherein the handling information comprises a task-distribution recording list configured for recording each of the task types corresponding to the interrupt requests that have ever been handled by which processor, wherein the interrupt assigning module further assigns the received interrupt request to one of the processors, which has handled the same task type of the received interrupt request, wherein the interrupt assigning module further modifies the task-distribution recording list after the assigning step, wherein the task type comprises an interrupt vector.

10. The interrupt handling apparatus of claim 9, wherein the handling information further comprises a weight value corresponding to each of the processors, wherein the interrupt assigning module further assigns the received interrupt request to one of the processors, which is chosen with a minimum weight value and was handled the same task type of the received interrupt request, and wherein the interrupt assigning module further modifies the weight value of the assigned processor handling the received interrupt request.

11. The interrupt handling apparatus of claim 9, wherein the handling information further comprises a priority value corresponding to each of the processors, wherein the priority value represents an importance level of the task performed by a corresponding processor, wherein the interrupt assigning module further assigns the received interrupt request to one of the processors, which is chosen with a minimum priority value and was handled the same task type of the received interrupt request.

* * * * *